United States Patent [19]
Cullen

[11] Patent Number: 5,464,049
[45] Date of Patent: * Nov. 7, 1995

[54] AGRICULTURAL FEED BAGGING MACHINE INCLUDING A ROTOR WINCH

[75] Inventor: Steven R. Cullen, Astoria, Oreg.

[73] Assignee: Versa Corporation, Astoria, Oreg.

[ * ] Notice: The portion of the term of this patent subsequent to Mar. 29, 2011, has been disclaimed.

[21] Appl. No.: 209,417

[22] Filed: Mar. 10, 1994

[51] Int. Cl.$^6$ .................................................. B65B 1/24
[52] U.S. Cl. .......................... 141/114; 141/71; 53/527; 53/529; 53/567; 53/576; 242/125.2
[58] Field of Search .................. 141/10, 71, 73, 141/114; 100/45, 65, 100, 144–149, 177, 211, 212; 53/255, 257, 260, 527, 529, 567, 576; 242/125.2, 125.3

[56] References Cited

U.S. PATENT DOCUMENTS

| | | | |
|---|---|---|---|
| 3,791,593 | 2/1974 | Griffin | 239/667 |
| 4,301,979 | 11/1981 | Cavanagh | 242/125.2 X |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,387,863 | 6/1983 | Edmonston et al. | 242/125.2 X |
| 4,502,378 | 3/1985 | Cullen | 100/65 |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,903,911 | 2/1990 | Sepke | 242/125.2 X |
| 4,938,432 | 7/1990 | Kurt et al. | 242/125.2 X |
| 4,945,715 | 8/1990 | Brodrecht | 53/567 |
| 4,949,633 | 8/1990 | Johnson et al. | 100/65 |
| 5,009,062 | 4/1991 | Urich et al. | 100/145 X |
| 5,159,877 | 11/1992 | Inman et al. | 100/144 |
| 5,213,143 | 5/1993 | Policky et al. | 141/71 |
| 5,269,829 | 12/1993 | Meyer | 71/9 |
| 5,295,554 | 3/1994 | Cullen | 180/236 |

*Primary Examiner*—J. Casimer Jacyna
*Attorney, Agent, or Firm*—Zarley, McKee, Thomte, Voorhees & Sease; Dennis L. Thomte

[57] ABSTRACT

An agricultural bagging machine including density control cables positioned in the tunnel of the machine and including means for anchoring the opposite ends of the density control cables. The machine also includes a cable rewind spool which is mounted on one end of the rotor of the machine to enable each of the density control cables to be pulled from the tunnel after the bag has been filled.

8 Claims, 3 Drawing Sheets

AGRICULTURAL FEED BAGGING MACHINE INCLUDING A ROTOR WINCH

BACKGROUND OF THE INVENTION

1. Field of the Invention

This invention relates to an agricultural feed bagging machine and more particularly to an agricultural feed bagging machine having density control cables associated therewith to control the density of the material being packed in the bag without the need for a backstop and cable brake. Still more particularly, the invention relates to a rotor winch which is used to pull the density control cables from the tunnel and/or bag after the bag is filled.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on a bagging machine with a brake associated therewith for braking or resisting the rotation of the drum with a selected brake force. A cable is wrapped around the drum and is connected to the backstop.

Although the cable drum and backstop structure of the '805 patent and other similar structures do function generally satisfactorily, the cables, which are positioned on opposite sides of the bag, can create openings or holes in the bag which will adversely affect the fermentation process within the bag. A further disadvantage of the cable drum and backstop structure of the device as such is shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake structure of the '666 patent apparently met with some success, it is believed that machines such as disclosed in the '666 patent experience slippage difficulties in wet field conditions which adversely affect the bagging operation.

In applicant's co-pending application, Ser. No. 07/912, 873, a bagging machine is described which has a the capability of enabling the density of the silage material to be selectively controlled without the need of an elaborate braking system. Although the bagging machine of Ser. No. 07/912,873 does satisfactorily achieve all of its objectives, a more simple way of controlling the density of the bag material was discovered and was the subject of patent application Ser. No. 08/003,540. In the machine of the co-pending application, Ser. No. 08/003,540, a plurality of density control cables are positioned in the tunnel. Although the density control cables disclosed in the co-pending application, Ser. No. 08/003,540, did perform satisfactory, it was difficult to pull the bagging machine from the filled bag due to the fact that the density control cables were still positioned in the silage material. In an effort to solve the problem of pulling the machine from the filled bag, applicant previously designed a hydraulic winch-drum to pull the density control cables from the tunnel in order to be able to pull the machine away from the filled bag. Although applicant's prior machine did function generally satisfactorily, it was necessary to provide an extra winch-drum which increased the cost of the machine and somewhat complicated the operation of the machine.

SUMMARY OF THE INVENTION

A agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A plurality of U-shaped density control cables are positioned in the tunnel to control the density of the material being packed in the agricultural bag. One end of each of each of the density control cables extends outwardly from the tunnel adjacent one side thereof and have a hydraulic cylinder connected thereto. A pressure gauge is operatively connected to the hydraulic cylinder to enable a read-out of the tension on the cables during the bagging operation.

The other ends of each of the density control cables extends outwardly from the tunnel at the other side thereof. Each of the other ends of the density control cables has a first swedge member secured thereto approximately two feet from the end and has a second swedge member secured thereto at the end of the cable. During bagging operations, the first swedge member on the cable is positioned in a retainment slot of a retainment bracket to anchor the end of the cable to the machine.

The bagging machine includes a conventional rotatable rotor having a shaft end exposed at one side of the machine. A cable rewind spool is mounted on the exposed end of the rotor shaft and has a plurality of key-shaped slot openings formed therein adapted to receive the second swedge members positioned on the ends of the density control cables.

When the bag has been filled and it is necessary to pull the machine from the filled bag, the ends of the cables are first disconnected from the hydraulic cylinder. The second swedge member on one cable is then inserted into one of the key-slot openings in the cable rewind spool. The rotor is then rotated which causes the density control cable connected thereto to be pulled from the tunnel. That operation is repeated until all of the density control cables have been pulled from the tunnel.

It is there a principal object of the invention to provide an improved agricultural bagging machine having density control cables associated therewith and having means for removing the density control cables from the tunnel after the bag has been filled.

A further object of the invention is to provide an improved agricultural feed bagging machine including density control cables positioned in the tunnel thereof and further including novel means for securing or anchoring the ends of the density control cables.

Still another object of the invention is to provide a convenient means for removing density control cables from the tunnel of an agricultural feed bagging machine after the agricultural bag has been filled.

Still another object of the invention is to provide an improved agricultural feed bagging machine including density control cables and further including means associated therewith to provide a read-out of the cable tension during the bagging operation.

These and other objects will be apparent to those skilled in the art.

Preferred Embodiment

Figure 1:
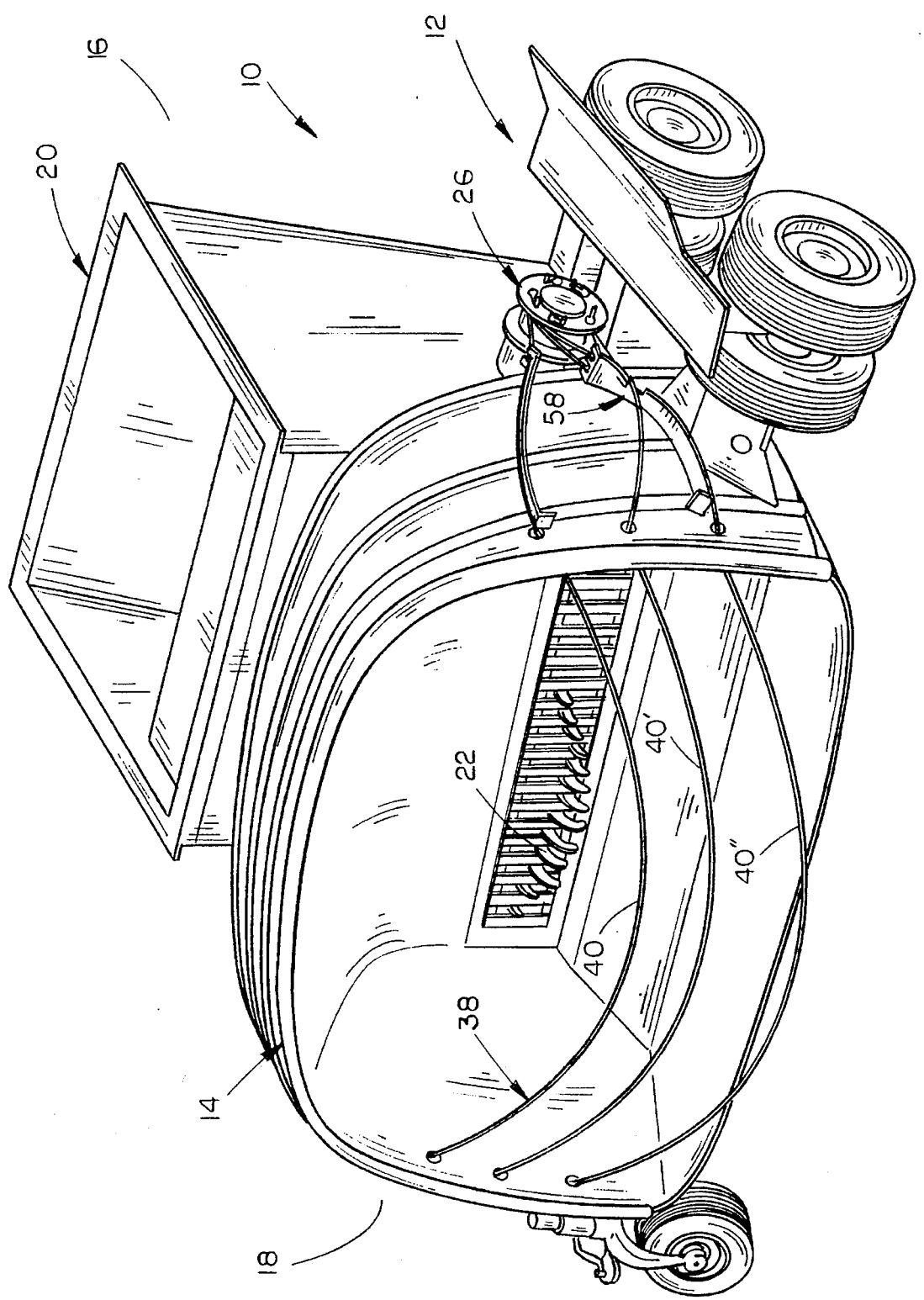
FIG. 1 is a rear perspective view of a bagging machine having the rotor winch of this invention mounted thereon.
Figure 2:
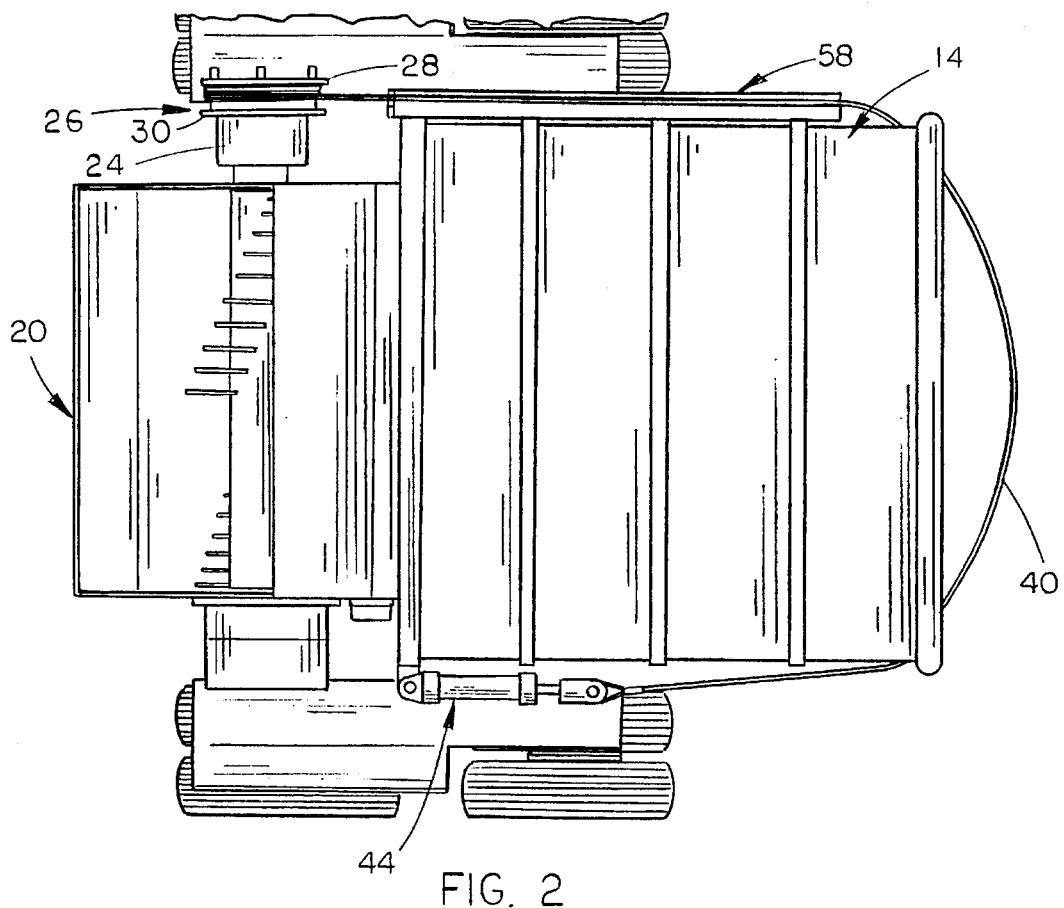
FIG. 2 is a top view of the machine of FIG. 1.
Figure 3:
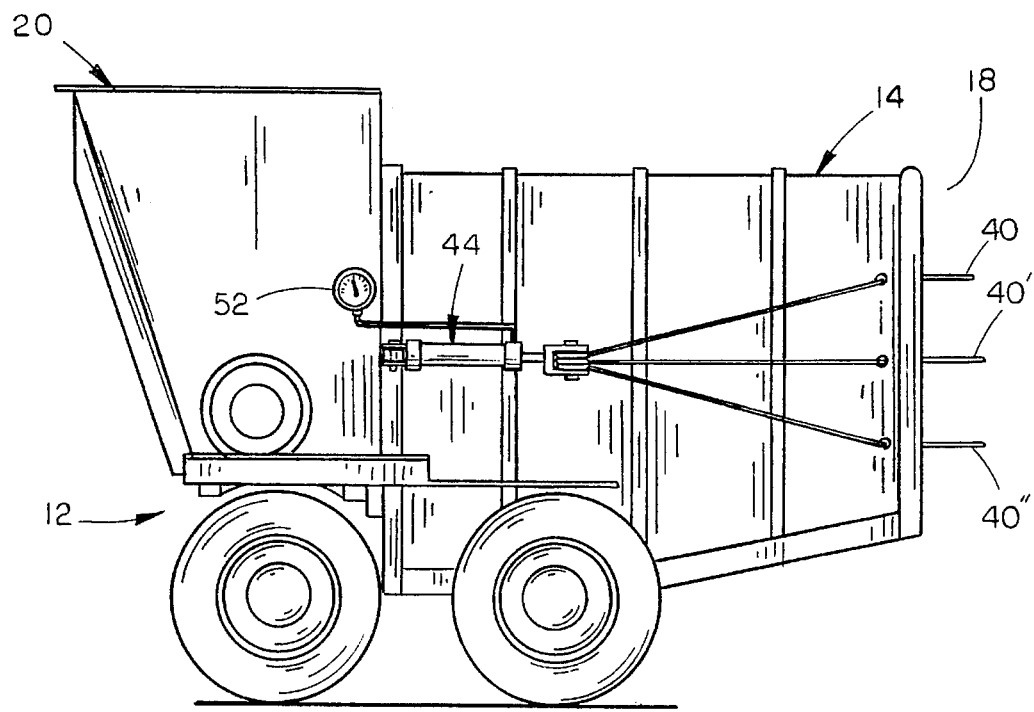
FIG. 3 is a side view of the machine of FIG. 1.
Figure 4:
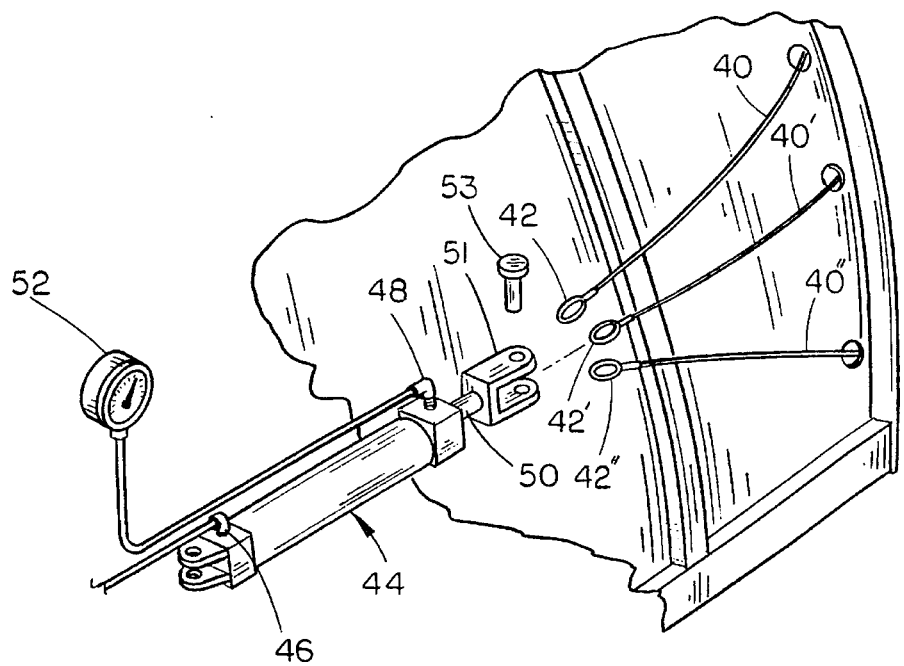
FIG. 4 is a perspective view of the cable tension read-out and associated hydraulic cylinder.

The numeral 10 refers to an agricultural bagging machine which is substantially conventional in design except for the new density control means positioned within the tunnel, the means for securing the ends of the density control cables and the means for pulling the density control cables from the tunnel after the bag has been filled as will be described in more detail hereinafter.

Machine 10 includes a wheel frame means 12 having a tunnel 14 mounted thereon upon which is normally positioned the open mouth of a conventional agricultural bag. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is located at the lower end of the hopper means 20 for forcing the materials to be bagged into the tunnel 14 and into the bag in conventional fashion. Rotor 22 includes an exposed shaft portion 24 which is positioned outwardly of one side of the machine.

Figure 5:
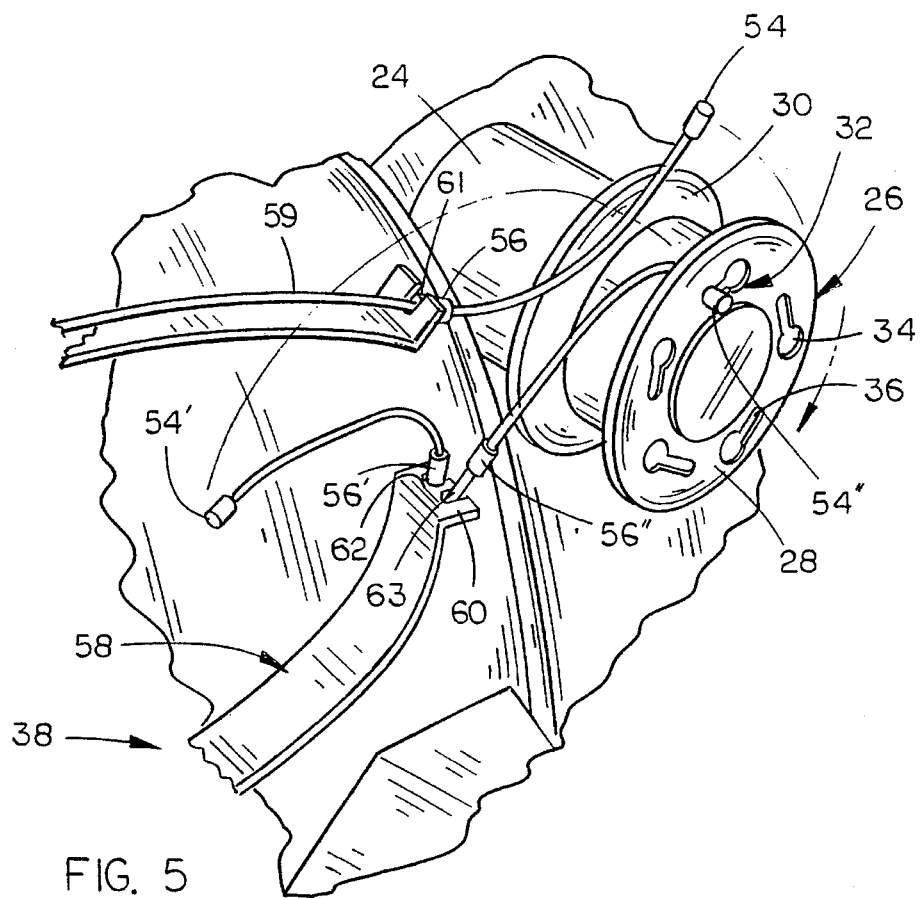
FIG. 5 is a rear perspective view of the rotor winch.

A cable rewind spool 26 is mounted on the end 24 of the rotor 22 and includes a pair of spaced-apart flanges 28 and 30 as best illustrated in FIG. 5. Flange 28 is provided with a plurality of spaced-apart openings 32 provided therein which define a key-slot configuration including a circular portion 34 and a slot portion 36.

The bagging machine 10 of this invention includes a density control means located in the tunnel 14 generally similar to that disclosed in my co-pending application, Ser. No. 08/003,540. For purposes of description, the density control means will be referred to generally by the reference numeral 38 and includes a plurality of density control cables 40, 40' and 40" which generally define a U-shape within the tunnel 14.

One end of the density control cables 40, 40' and 40" extend outwardly from the tunnel 14 and one side thereof and have cable eyes 42, 42' and 42" mounted thereon respectively which are adapted to be connected to a hydraulic cylinder 44 which is operatively connected to the hydraulic system of the bagging machine or the tractor. Hydraulic cylinder 44 includes a pair of ports 46 and 48 having hydraulic hoses connected thereto so as to permit the extension and retraction of the rod 50. Pressure gauge 52 is operatively connected to the port 48 to enable a read-out of the cable tension of the cables 40, 40' and 40" during the bagging operation. Each of the density control cables 40, 40' and 40" is removably connected to the clevis 51 on rod 50 by means of pin 53.

The other end of the cables 40, 40' and 40" are provided with a swedge or swedge member 54, 54' and 54" secured thereto. Second swedge or swedge members 56, 56' and 56" are also secured to cables 40, 40' and 40" approximately 24" from the swedges 54, 54' and 54" respectively. Each of the swedges 54 are adapted to be received within an opening 32 as will be described in more detail hereinafter.

An arcuate cable retainer 58 is provided which is secured to the machine so as to provide a means for anchoring the ends of cables 40, 40' and 40". Retainer 58 includes an end portion 60 having retainment slots 62 and 63 formed therein which are adapted to receive the cables 40' and 40" respectively. Arcuate cable retainer 59 is also provided and which has a retainment slot 61 formed therein to receive cable 40.

During the bagging operation, cables 40' and 40" will be received in the slots 62 and 63 of retainer 58 with the swedges 56' and 56" thereon being positioned forwardly of the end portion 60 to anchor the cables 40' and 40". Cable 40 is received by the retainment slot 61 in cable retainer 59 in identical fashion. The hydraulic cylinder 44, which is connected to the other ends of the cables 40, 40' and 40", will be extended or retracted to achieve the proper length of the cables within the tunnel 14. During the bagging operation, the operator of the machine is able to read the gauge 52 to ascertain the cable tension on the cables 40, 40' and 40" within the tunnel 14. The hydraulic cylinder may be "tuned" to achieve the desired cable tension by extending or retracting the rod 50.

When the bag has been filled, the hydraulic cylinder 44 is extended to permit the cable eyes 42, 42' and 42" of the cables 40, 40' and 40" to be disconnected therefrom by removing pin 53. The swedge 54" on the cable 40" is then inserted into one of the openings 32 and the rotor is rotated. As the rotor is rotated, the cable 40" is wrapped around the cable rewind spool between the flanges 28 and 30. As the cable rewind spool is rotated by the rotating rotor 22, swedge 56" is disengaged from the retainer 58. Once the entire length of the cable 40" has been wrapped around the cable rewind spool 26, the operation is successively repeated for cables 40 and 40'. Although three density control cables 40, 40' and 40" have been described, any number of density control cables may be employed as desired.

Thus it can be seen that a novel rotor winch has been provided for pulling the density control cables from the tunnel after the bag has been filled. It can also be seen that a novel means has been provided for determining the cable tension of the density control cables. It can also been seen a novel means has been provided for anchoring the cables in such a fashion so that they may be easily released and may be easily wrapped around a cable rewind spool.

Thus it can be seen that the invention accomplishes at least all of its stated objectives.

I claim:

1. An agricultural feed bagging machine for bagging agricultural feed material into agricultural bags having a closed end and an open mouth comprising:

a frame means having rearward and forward ends;

a hopper on said frame means for receiving the material to be bagged;

a horizontally disposed rotor rotatably mounted on said frame means, said rotor including a shaft end which is exposed at a position laterally of said machine;

said rotor being in communication with said hopper for forcing the material to be bagged rearwardly therefrom;

a cable rewind spool mounted on said shaft end for rotation therewith and including a vertically disposed flange;

said flange having at least one opening formed therein for receiving one end of a density control cable;

a tunnel on said frame means rearwardly of said hopper and said rotor for receiving the material being forced rearwardly from said rotor, said tunnel having an intake end which receives the material from said rotor and an output end adapted to receive the open mouth of the agricultural bag;

at least one substantially U-shaped density control cable positioned within said tunnel and having first and second ends positioned outwardly of said tunnel adjacent the forward end thereof;

said density control cable being positioned in the feed material as the feed material is being bagged into the agricultural bag;

first anchor means selectively securing said cable, adjacent said first end thereof, against movement;

second anchor means selectively securing said second end of said cable against movement;

said cable having means on its said second end, for reception by said opening in said flange, so that rotation of said rotor will cause said cable to be wrapped around said cable rewind spool and pulled from said tunnel after said first end of said cable has been disconnected from said first anchor means.

2. The machine of claim 1 wherein said first anchor means comprises a hydraulic cylinder.

3. The machine of claim 1 wherein said second anchor means comprises a retainer bracket having a cable retainment slot formed therein for receiving said cable.

4. The machine of claim 3 wherein a first swedge member is secured to said density control cable at a location which is spaced from the said first end of said cable for engagement with said retainer bracket adjacent said retainment slot.

5. The machine of claim 4 wherein a second swedge member is secured to said first end of said cable for engagement with said retainer bracket.

6. An agricultural feed bagging machine for bagging agricultural feed material into agricultural bags having a closed end and an open mouth comprising:

a frame means having rearward and forward ends;

a hopper on said frame means for receiving the material to be bagged;

a horizontally disposed rotor rotatably mounted on said frame means, said rotor including a shaft end which is exposed at a position laterally of said machine;

said rotor being in communication with said hopper for forcing the material to be bagged rearwardly therefrom;

a cable rewind spool mounted on said shaft end for rotation therewith and including a vertically disposed flange;

said flange having at least one opening formed therein for receiving one end of a density control cable;

a tunnel on said frame means rearwardly of said hopper and said rotor for receiving the material being forced rearwardly from said rotor, said tunnel having an intake end which receives the material from said rotor and an output end adapted to receive the open mouth of the agricultural bag;

at least one substantially U-shaped density control cable positioned within said tunnel and having first and second ends positioned outwardly of said tunnel adjacent the forward end thereof;

first anchor means selectively securing said cable, adjacent said first end thereof, against movement;

second anchor means selectively securing said second end of said cable against movement;

said cable having means on its said second end, for reception by said opening in said flange, so that rotation of said rotor will cause said cable to be wrapped around said cable rewind spool and pulled from said tunnel after said first end of said cable has been disconnected from said first anchor means;

said first anchor means comprising a hydraulic cylinder.

7. An agricultural feed bagging machine for bagging agricultural feed material into agricultural bags having a closed end and an open mouth comprising:

a frame means having rearward and forward ends;

a hopper on said frame means for receiving the material to be bagged;

a horizontally disposed rotor rotatably mounted on said frame means, said rotor including a shaft end which is exposed at a position laterally of said machine;

said rotor being in communication with said hopper for forcing the material to be bagged rearwardly therefrom;

a cable rewind spool mounted on said shaft end for rotation therewith and including a vertically disposed flange;

said flange having at least one opening formed therein for receiving one end of a density control cable;

a tunnel on said frame means rearwardly of said hopper and said rotor for receiving the material being forced rearwardly from said rotor, said tunnel having an intake end which receives the material from said rotor and an output end adapted to receive the open mouth of the agricultural bag;

at least one substantially U-shaped density control cable positioned within said tunnel and having first and second ends positioned outwardly of said tunnel adjacent the forward end thereof;

first anchor means selectively securing said cable, adjacent said first end thereof, against movement;

second anchor means selectively securing said second end of said cable against movement;

said cable having means on its said second end, for reception by said opening in said flange, so that rotation of said rotor will cause said cable to be wrapped around said cable rewind spool and pulled from said tunnel after said first end of said cable has been disconnected from said first anchor means;

said second anchor means comprising a retainer bracket having a cable retainment slot formed therein for receiving said cable;

a first swedge member secured to said density control cable at a location which is spaced from the said first end of said cable for engagement with said retainer bracket adjacent said retainment slot.

8. The machine of claim 7 wherein a second swedge member is secured to said first end of said cable for engagement with said retainer bracket.

* * * * *